Figure 1:
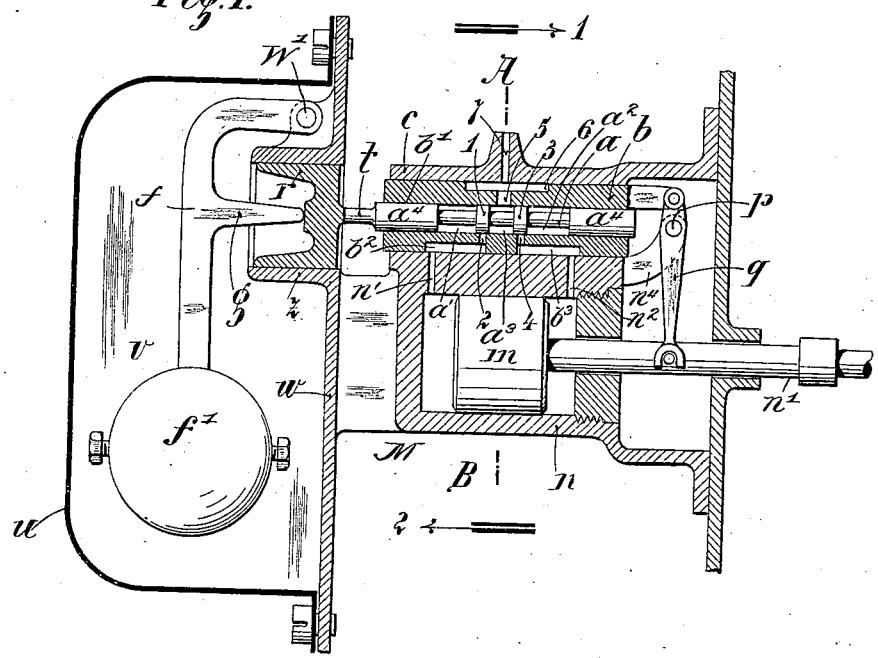

No. 881,930. PATENTED MAR. 17, 1908.
A. E. JONES.
IMMERSION REGULATOR.
APPLICATION FILED AUG. 6, 1906.

Witnesses

Inventor:
Albert Edward Jones
by B. Singer atty.

UNITED STATES PATENT OFFICE.

ALBERT EDWARD JONES, OF FIUME, AUSTRIA-HUNGARY.

IMMERSION-REGULATOR.

No. 881,930.          Specification of Letters Patent.     Patented March 17, 1908.

Application filed August 6, 1906. Serial No. 329,403.

*To all whom it may concern:*

Be it known that I, ALBERT EDWARD JONES, engineer, citizen of the Kingdom of England, residing at Fiume, Austria-Hungary, have invented certain new and useful Improvements in Immersion-Regulators, of which the following is a specification, reference being had therein to the accompanying drawing.

This invention relates to the improvements in mechanism for automatically controlling and maintaining a predetermined depth of submergence of torpedoes and other submarine craft of that character wherein an auxiliary motor or engine is operatively connected with the submerging rudder and wherein the motive fluid for operating said auxiliary engine is regulated by slide valves which in turn are operated by hydrostatic means. Usually the hydrostatic means consists of a hydrostatic chamber in which is inclosed a pendulum or spring adapted to act, with a predetermined amount of force, upon a diaphragm or piston in apposition to the hydrostatic pressure which is utilized to act against, that portion of the diaphragm, apposite to the point acted upon by the pendulum or spring. In devices of this character the mechanism is so arranged that when the torpedo is launched, or when the craft is near the surface of the water, the spring or pendulum will overcome the hydrostatic pressure and cause admission of pressure fluid in the engine to force the rudder into an inclined position, with respect to longitudinal axis of the torpedo. During its downward or diving movement the gradually increasing hydrostatic pressure will, when the torpedo has reached a predetermined depth of submergence, equalize the opposing pressure of the spring or pendulum and the hydrostatic mechanism will repose in an equilibrum of pressure thereby maintaining the engine in such a position as to hold the rudder in a plane coincident with the longitudinal axis of the torpedo, causing the latter to progress in a horizontal plane. In devices of this nature it has been found that in the most efficient operation the auxiliary engine, which is connected with the submerging rudder is provided with a relatively long stroke whereas the valves, which control the admission of pressure fluid to the engine, are given a relatively short stroke; which latter is necessary because of the impracticability of depending upon hydrostatic pressure to effect a relatively extended stroke of the valves.

It is therefore one of the objects of this invention to reduce, as much as possible, the length of stroke of the valves, operated by the hydrostatic member, and to increase, as much as possible or as is desirable, the stroke of the engine and to embody the mechanism in a compact form.

To this end the invention consists and will be described in connection with the accompanying drawings and will be particularly pointed out in and by the appended claims.

Figure 2:
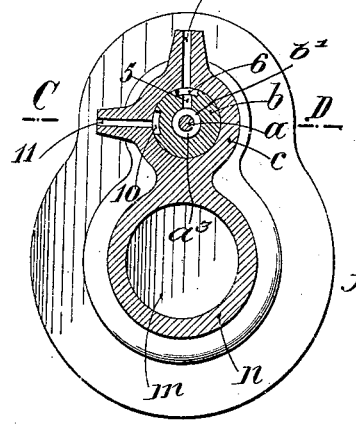
Figure 3:
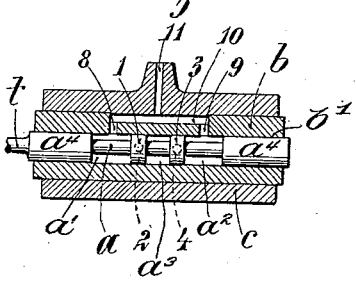

In the drawing. Figure 1 is a longitudinal sectional view of a device embodying the main features of my invention. Fig. 2 is a sectional view on line A—B of Fig. 1. Fig. 3 is a sectional view on line C—D of Fig. 2.

Like characters of reference designate similar parts throughout the different figures of the drawing.

As shown M designates as a whole a structure in which is formed a cylinder $n$. A piston $m$ is provided for said cylinder and the piston rod $n'$ thereof is adapted to be connected in any suitable manner with a submersion rudder, not shown. $c$ designates a valve casing which is formed in said structure M and which is provided with an inlet for the pressure fluid, designated by 7 and an exhaust therefor designated by 11. The cylinder $n$ is provided with ports $n'$ and $n^2$ which communicate with the valve casing $c$ and serve either as exhaust or inlet ports. Within the valve casing $c$ there are disposed two coöperating valves for controlling the admission to and the exhaust from the cylinder $n$ and inasmuch as one of said valves, $b$, is operated from the piston rod of the engine and as the other valve, $a$, is operated by a hydrostatic member the two valves will hereinafter be designated as the engine and hydrostatic valves respectively. As herein shown the engine valve $b$ is of the cylindrical slide valve type and is provided with an elongated port 6, adapted to remain at all times in communication with the inlet 7, and a similar elongated port 10 adapted to remain at all times in communication with the exhaust 11. Said valve $b$ is provided with a cylindrical bore $b'$ adapted to receive the hydrostatic valve $a$, which is of the piston type. A port 5 in the valve $b$ establishes a communication between the port 6 and the bore $b'$, for the inlet of pressure fluid, and ports 8 and 9 establish communication between the bore $b'$ and the port 10, for the exhaust of pressure fluid. Ports $b^2$ and $b^3$ communicate respectively with ports $n'$ and $n^2$, of the cylinder $n$ and are provided with terminals 2 and 4 whereby ingress and egress of the pressure fluid is afforded between the bore $b'$ and the cylinder $n$. The valve $a$ is provided with annular exhaust chambers $a'$ and $a^2$ and an admission chamber $a^3$ formed between end bearing portions $a^4$ and central bearing portions 1 and 3 respectively.

A hydrostatic chamber $v$ is provided and as shown is rigidly secured to the structure $n$ in the following manner. A wall $w$, formed integral with the structure $n$ supports a casing $u$, which as shown, is secured to the wall $w$ by screws. The hydrostatic chamber is provided with a member, which is shown in the form of a piston $r$, adapted to be normally exposed and operated in one direction by hydrostatic pressure. Conveniently a cylinder $z$ is formed in the wall $w$ to accommodate said piston $r$. A pendulum $f$, pivotally mounted at $w'$, is provided with an adjustable weight $f'$ and is adapted to act upon the piston $r$ in opposition to the hydrostatic pressure and to this end said pendulum $f$ is provided with an extension $g$ which normally engages the piston $r$.

In order to obtain the greatest possible accuracy of displacement of the valve $a$ and to avoid and dispense with operating mechanism usually interposed between the valve $a$ and the piston $r$, the same as herein shown at $t$, are rigidly connected with each other and preferably they are formed integral.

In order to reduce the size of the hydrostatic mechanism so that the same will require as small amount of space as possible it is necessary to provide a valve mechanism capable of performing its function with a relatively short stroke because of the necessary reduction in size of the pendulum and the restricted sweep of its swing. It is also desirable and has been found in practice that more accurate results are obtained where the hydrostatic member, such as the piston $r$, has as short a stroke as possible. For reasons which will hereinafter more fully appear it is essential that there should be imparted to the valve $b$ a degree of displacement equal to the displacement of the valve $a$ and inasmuch as the length of stroke of the piston $m$, in order to effect the desired movement of the submersion rudder must greatly exceed the movement of the valves $a$ or $b$, means are provided for operatively connecting the valve $b$ with the piston whereby movement of the latter will impart to the valve $b$ a displacement equal to but not exceeding the displacement of the valve $a$. As shown the valve $b$ and the piston rod $n'$ are connected by means of a lever $q$ which is pivoted to a bracket $n^4$. The pivot, which is designated at $p$ is so disposed with respect to the ends of the lever $q$ as to impart the desired reduction of movement to the valve $b$ with respect to the movement of the piston $n$ to cause the movement of the valve $b$ to equal that of the valve $a$.

The operation is as follows:—Assuming that the torpedo or craft to which the invention may be applied is above the desired or predetermined depth, the hydrostatic pressure on the piston $r$ will be less than the pressure of the pendulum and therefore the latter will move the piston $r$ and the valve $a$ in the direction of arrow 1. This will result in the admission of pressure fluid through port 5 to terminal 4 and port $n^2$ to the right hand side of the piston $m$ thereby forcing the same in the direction of arrow 2. The cylinder $n$ will then exhaust through port $n'$, terminal 2 and ports 8 and 10 to exhaust 11. Simultaneously with the movement of the piston $n$ the lever $q$ will have imparted movement to the valve $b$ in the direction of arrow 1 equal in extent to the movement of the valve $a$ and in the same direction whereby the terminals 2 and 4 will be closed and the parts will occupy the same relative position as in Fig. 1 in which both exhaust and inlet of the pressure fluid will be closed and the piston $n$ will remain locked in its adjusted position and will thereby lock the rudder. The rudder having been locked in a position to cause the torpedo to descend, the same will dive to the required or predetermined depth at which point the hydrostatic pressure will have gradually increased and will now overcome the force exerted by the pendulum thereby causing the piston $r$ to move in a reversed direction to the direction first described or in other words in the direction of arrow 2. This movement of the piston $r$ will continue until the hydrostatic pressure equals the force exerted by the pendulum at which point the piston $r$ will repose in an equilibrium of pressure. This last named movement of the piston $r$ will impart a like movement in the same direction of the valve $a$ thereby adjusting the ports so as to move the piston $n$ in the direction of arrow 1. Such movement of the piston $n$ will impart a corresponding movement to the valve $b$ thereby locking the piston $n$ and serving to hold the rudder in a position to maintain the torpedo at the required depth of submergence.

I claim:—

1. A submersion controller comprising in combination, a stationary cylinder provided with inlet and exhaust ports for the pressure fluid, a piston for said cylinder adapted to operate a submersion rudder, coöperating hydrostatic and engine valves for controlling admission of and exhaust of pressure fluid to and from said cylinder, said hydrostatic valve having a relatively restricted stroke with respect to the stroke of said piston, means for operatively connecting said engine valve with said piston whereby the stroke of said engine valve is made equal to that of the hydrostatic valve, a hydrostatic chamber, a pendulum therein, and a hydrostatic piston rigidly connected with said hydrostatic valve and exposed to the action of the surrounding water and operated by the oppositely directed forces of the hydrostatic pressure and said pendulum.

2. A submersion controller comprising in combination, a stationary cylinder provided with inlet and exhaust ports for the pressure fluid, a piston for said cylinder adapted to operate a submersion rudder, coöperating hydrostatic and engine valves for controlling admission of and exhaust of pressure fluid to and from said cylinder, said hydrostatic valve having a relatively restricted stroke with respect to the stroke of said piston, means for operatively connecting said engine valve with said piston whereby the stroke of said engine valve is made equal to that of the hydrostatic valve, a hydrostatic chamber, a pendulum therein, and a hydrostatic piston for said chamber operatively connected with said hydrostatic valve and exposed to the action of the surrounding water and operated by the oppositely directed forces of the hydrostatic pressure and said pendulum.

3. A submersion controller comprising in combination, an auxiliary engine provided with a piston adapted to operate a submersion rudder, coöperating hydrostatic and engine valves for controlling the admission of pressure fluid to said engine, said hydrostatic valve having a relatively restricted stroke with respect to the stroke of said piston, hydrostatic mechanism directly connected with said hydrostatic valve, and means operatively connecting said engine valve with said piston whereby the stroke of said engine valve is made equal to the stroke of said hydrostatic valve.

In testimony whereof I hereunto affix my signature in presence of two witnesses.

ALBERT EDWARD JONES.

Witnesses:
   Louis Loppet,
   C. de Meichsuky.